US012422782B2

(12) United States Patent
Feyer

(10) Patent No.: US 12,422,782 B2
(45) Date of Patent: Sep. 23, 2025

(54) SAFETY DEVICE AND STRIKING-WORK MECHANISM

(71) Applicant: Omega SA, Biel/Bienne (CH)

(72) Inventor: Julien Feyer, Vernier (CH)

(73) Assignee: Omega SA, Biel/Bienne (CH)

( * ) Notice: Subject to any disclaimer, the term of this patent is extended or adjusted under 35 U.S.C. 154(b) by 795 days.

(21) Appl. No.: 17/115,964

(22) Filed: Dec. 9, 2020

(65) Prior Publication Data

US 2021/0200159 A1 Jul. 1, 2021

(30) Foreign Application Priority Data

Dec. 31, 2019 (EP) .................................... 19220189

(51) Int. Cl.
*G04F 7/08* (2006.01)
*G04B 21/02* (2006.01)
*G04B 21/12* (2006.01)

(52) U.S. Cl.
CPC ........... *G04F 7/0847* (2013.01); *G04B 21/02* (2013.01); *G04B 21/12* (2013.01); *G04F 7/0814* (2013.01)

(58) Field of Classification Search
CPC ........ G04F 7/0847; G04F 7/0814; G04F 7/08; G04B 21/12; G04B 21/02
See application file for complete search history.

(56) References Cited

U.S. PATENT DOCUMENTS

| | | | | |
|---|---|---|---|---|
| 9,098,068 B2 * | 8/2015 | Greubel | | G04B 11/006 |
| 9,348,319 B1 * | 5/2016 | Genoud | | G04F 7/0842 |
| 10,579,018 B2 * | 3/2020 | Von Allmen | | G04B 13/00 |
| 10,732,570 B2 * | 8/2020 | Peter | | G04B 21/10 |
| 11,194,291 B2 * | 12/2021 | Kissling | | G04B 25/00 |
| 2008/0192585 A1 | 8/2008 | Corthesy et al. | | |
| 2012/0243385 A1 * | 9/2012 | Goeller | | G04B 21/10 368/71 |
| 2013/0121120 A1 * | 5/2013 | Greubel | | G04B 21/12 368/267 |

(Continued)

FOREIGN PATENT DOCUMENTS

| | | |
|---|---|---|
| CH | 713 279 A2 | 6/2018 |
| CH | 714 420 A2 | 6/2019 |

(Continued)

OTHER PUBLICATIONS

European Search Report issued Jul. 14, 2020 in European Application 19220189.5 filed Dec. 31, 2019 (with English Translation of Categories of Cited Documents), citing documents AA and AO-AQ therein, 3 pages.

(Continued)

*Primary Examiner* — Edwin A. Leon
*Assistant Examiner* — Sean R Brannon
(74) *Attorney, Agent, or Firm* — Oblon, McClelland, Maier &Neustadt, L.L.P.

(57) ABSTRACT

A safety device for a striking-work including a first wheel, a second wheel and an actuating member. The first wheel is meshed which drives it in rotation about a shaft and it includes an abutment member. The second wheel is also in rotation about the shaft and is in contact with the abutment member. The second wheel includes a portion configured for an actuating member to act on the intermediate portion so as to move the second wheel.

13 Claims, 4 Drawing Sheets

(56) References Cited

U.S. PATENT DOCUMENTS

| | | | | |
|---|---|---|---|---|
| 2018/0181070 | A1 | 6/2018 | Behra et al. | |
| 2019/0187617 | A1* | 6/2019 | Peter | G04B 21/10 |
| 2019/0286059 | A1* | 9/2019 | Jung | G04B 21/06 |

FOREIGN PATENT DOCUMENTS

| | | | |
|---|---|---|---|
| CN | 2102530 | U | 4/1992 |
| CN | 101488005 | A | 7/2009 |
| CN | 106292246 | A | 1/2017 |
| CN | 106896703 | A | 6/2017 |
| CN | 109298618 | A | 2/2019 |
| CN | 110543091 | A | 12/2019 |
| EP | 3 339 977 | A1 | 6/2018 |
| EP | 3 382 471 | A1 | 10/2018 |
| EP | 3 502 793 | A1 | 6/2019 |
| JP | 2013-250149 | A | 12/2013 |
| WO | WO 2013/104802 | A1 | 7/2013 |

OTHER PUBLICATIONS

Combined Chinese Office Action and Search Report issued Feb. 22, 2022 in corresponding Chinese Patent Application No. 202011629023.0 (with English Translation of Category of Cited Documents) citing documents AA, AL-AU therein, 6 pages.

* cited by examiner

SAFETY DEVICE AND STRIKING-WORK MECHANISM

CROSS-REFERENCE TO RELATED APPLICATION

This application claims priority to European Patent Application No. 19220189.5 filed on Dec. 31, 2019, the entire disclosure of which is hereby incorporated herein by reference.

TECHNICAL FIELD

The field of the present invention relates to that of safety devices. More particularly, the present invention relates to the field of surprise-pieces in horological mechanisms.

TECHNOLOGICAL BACKGROUND

The striking-work mechanism is a very particular mechanism that is often used with a surprise-piece fastened onto a snail so as to prevent wrong striking, or more exactly striking the hour indicated by an indicator on a dial, which is not easy just before a change of ten or of a quarter for example.

Indeed, this passage is generally complicated since when it is a question of going from one hour to another, or from 59 minutes 50 seconds for example, and, in the absence of a surprise-piece, the striking-work mechanism (200) can strike the following hour instead of striking the hour indicated, which leads to confusion for the user.

Via the surprise-piece, a safety mechanism well known to horologists (see for example "les montres compliquées" by François Lecoultre pages 175-181), it is possible to manage the passages from 14 to 0 minutes every quarter and the passage from 59 to 0 every hour, for example.

However, this mechanism is sensitive, complicated and leads to an additional taking of torque at the end of striking.

Moreover, in the particular case of a chronograph repeater, when the jumper of the conventional striking-work mechanism is in contact with the surprise-piece, the latter applies a torque onto the chronograph wheel and can thus make the chronograph friction-spring slip and thus move the chronograph hand, which would cause an incorrect reading of the time timed by the user.

SUMMARY OF THE INVENTION

The present invention proposes resolving all or a part of these disadvantages via a safety device for a striking-work of a horological mechanism for striking the integer part of a number indicated by an indicator on a dial; said safety device comprising at least:

- a first wheel; said at least one first wheel being configured to be meshed with and movably mounted on a shaft; said at least one first wheel comprising at least one abutment member;
- a second wheel; said at least one second wheel being movably mounted on said shaft and configured to be driven by said at least one abutment member when said at least one first wheel is meshed; said at least one second wheel including at least one first portion corresponding to the integer part of a first number, at least one second portion corresponding to the integer part of a second number and at least one intermediate portion disposed between said at least one first portion and said at least one second portion;

- an actuating member; said at least one actuating member being configured to act on said at least one intermediate portion so as to free said at least one second wheel from said at least one abutment member and preferably strike the integer part of said second number.

Via this arrangement, the mechanism is simplified by the absence of a surprise-piece and thus of stresses applied onto the chronograph wheel.

In other words, the present invention relates to a safety device without a surprise-piece comprising at least:

- a first wheel; said at least one first wheel being configured to be meshed with and movably mounted on a shaft; said at least one first wheel comprising at least one abutment member;
- a second wheel; said at least one second wheel being movably mounted on said shaft and configured to be driven by said at least one abutment member when said at least one first wheel is meshed; said at least one second wheel including at least one first portion corresponding to the integer part of a first number, at least one second portion corresponding to the integer part of a second number and at least one intermediate portion disposed between said at least one first portion and said at least one second portion;
- an actuating member; said at least one actuating member being configured to act on said at least one intermediate portion so as to free said at least one second wheel from said at least one abutment member and preferably strike the integer part of said second number.

According to one embodiment, said at least one first wheel is mounted movably in rotation about said shaft.

Via this arrangement, the mechanism is more compact and better adapted for repetitive movements.

According to one embodiment, said at least one second wheel is mounted movably in rotation about said shaft.

Via this arrangement, the mechanism is more compact and better adapted for repetitive movements.

According to one embodiment, said at least one second wheel is mobile between at least one first position and at least one second position; said at least one second wheel is in contact with said at least one abutment member when said at least one second wheel is at said at least one first position or at said at least one second position.

Via this arrangement, said at least one second wheel can move between at least two positions.

According to one embodiment, said at least one first wheel comprises at least one tooth to be meshed; said at least one tooth includes at least one surface and/or at least one dimension configured to move said at least one actuating member of said at least one first portion or of said at least one second portion towards said at least one intermediate portion and preferably to move said at least one actuating member in contact with said at least one intermediate portion so that said at least one actuating member acts on said at least one intermediate portion and frees said at least one second wheel from said at least one abutment member.

Via this arrangement, said at least one second wheel is freed from said at least one abutment member.

According to one embodiment, said at least one actuating member is configured to exert a force on said at least one second wheel and preferably on said at least one first portion, said at least one second portion and/or said at least one intermediate portion so as to free said at least one second wheel from said at least one abutment member; said force being generated by the force of gravity and/or by a bearing force exerted by a return member and/or a drive member on said at least one actuating member.

Via this arrangement, said at least one actuating member exerts a force on said at least one second wheel so that it moves.

According to one embodiment, said at least one intermediate portion decomposes said force into a component radial to said shaft and a component perpendicular to the radial component configured to move said at least one intermediate portion so that said at least one second wheel is freed from said at least one abutment member.

Via this arrangement, said at least one actuating member exerts a force on said at least one second wheel so that it moves.

According to one embodiment, said at least one actuating member is in contact with said at least one second wheel and preferably in contact with said at least one first portion corresponding to the integer part of a first number and at least one second portion corresponding to the integer part of a second number, separated by at least one intermediate portion.

Via this arrangement, said at least one actuating member exerts a force on said at least one second wheel so that it moves.

According to one embodiment, said at least one first wheel comprises a disc and/or a pinion.

Via this arrangement, said at least one first wheel can be meshed.

According to one embodiment, said at least one second wheel is a striking-work cam.

Via this arrangement, said at least one second wheel has a profile corresponding to seconds, tens of seconds, minutes, tens of minutes, quarter minutes, hours, tens of hours, quarter hours.

According to one embodiment, said at least one abutment member is disposed on said at least one first wheel.

Via this arrangement, said at least one first wheel can drive said at least one second wheel via said at least one abutment member.

According to one embodiment, said at least one first portion and said shaft are distant by a first distance, said at least one second portion and said shaft are distant by a second distance and said at least one intermediate portion and said shaft are distant by an intermediate distance between said first distance and said second distance.

Via this arrangement, the member can pass the minutes or the seconds.

The present invention relates to a striking-work mechanism comprising at least one safety device according to one aspect of the invention, at least one arm and at least one striking-work cam disposed on said at least one safety device; said at least one striking-work cam including at least one distal portion representing the integer part of said first number and at least one proximal portion representing the integer part of said second number; said at least one proximal portion being closer to said shaft than said at least one distal portion so that when said at least one actuating member acts on said at least one intermediate portion, said at least one arm is moved from said at least one distal portion towards said at least one proximal portion.

Via this arrangement, the mechanism is simplified by the absence of a surprise-piece and the energy is optimised since there is no superfluous taking of torque. Moreover, the striking-work mechanism cannot strike incorrectly at the moment of passage from one minute to another, or at 59 seconds for example.

According to one embodiment, said at least one striking-work cam is a striking-work cam of the seconds, of the tens of seconds, of the quarter minutes, of the minutes, or of the quarter hours.

Via this arrangement, the mechanism can strike the quarter minute and/or quarter hour.

According to one embodiment, said at least one striking-work cam is a snail of the seconds, of the minutes or of the hours.

Via this arrangement, the mechanism can strike the number of seconds, of minutes and/or of hours.

The present invention relates to a chronograph comprising at least one driven wheel, safety device according to the invention and/or a striking-work mechanism according to the invention, wherein said at least one actuating member drives said at least one driven wheel when said at least one actuating member acts on said at least one intermediate portion.

Via this arrangement, the mechanism is simplified by the absence of a surprise-piece and the energy is optimised since there is no superfluous taking of torque. Moreover, the striking-work mechanism cannot strike incorrectly at the moment of passage from one minute to another, or at 59 seconds for example.

The embodiments and the alternatives mentioned above can be taken alone or according to any technically possible combination.

The present invention will be well understood and its advantages will also be clear in light of the following description, given only as a non-limiting example and made in reference to the appended drawings, in which identical reference signs correspond to structurally and/or functionally identical or similar members.

BRIEF DESCRIPTION OF THE DRAWINGS

The invention will be described below in a more detailed manner using the appended drawings, given as examples that are in no way limiting, in which.

DETAILED DESCRIPTION OF THE INVENTION

Figure 1:
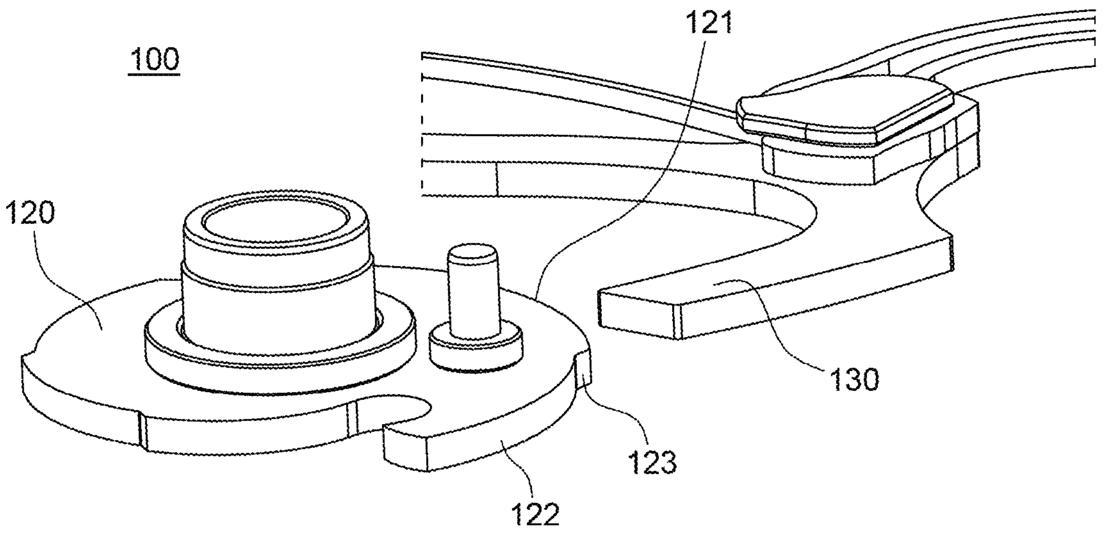
FIG. 1 illustrates a safety device 100 according to one embodiment.

The present invention proposes omitting the use of a surprise-piece in a striking-work mechanism 200 in order to simplify it on the one hand and on the other hand to avoid a superfluous taking of torque and thus optimise the energy available for the horological and/or striking-work mechanism. Moreover, one of the advantages related to this arrangement is to allow said striking-work mechanism 200 to strike correctly, at the moment of passage from one minute to another, or at 59 seconds for example.

To do this, said striking-work mechanism 200 comprises at least one safety device 100 shown in FIGS. 1-3B, at least one arm 230 that can take the form of a feeler-spindle 230 for example, and at least one striking-work cam 210 disposed on said at least one safety device 100.

In FIGS. 2A to 4B, an embodiment according to the invention shows a chronograph repeater that can strike the minutes, the tens of seconds and/or the second but without being limited to a chronograph repeater since said striking-work mechanism 200 can also function for any other watch with a striking-work for example such as a watch with a minute repeater.

Figure 4A:
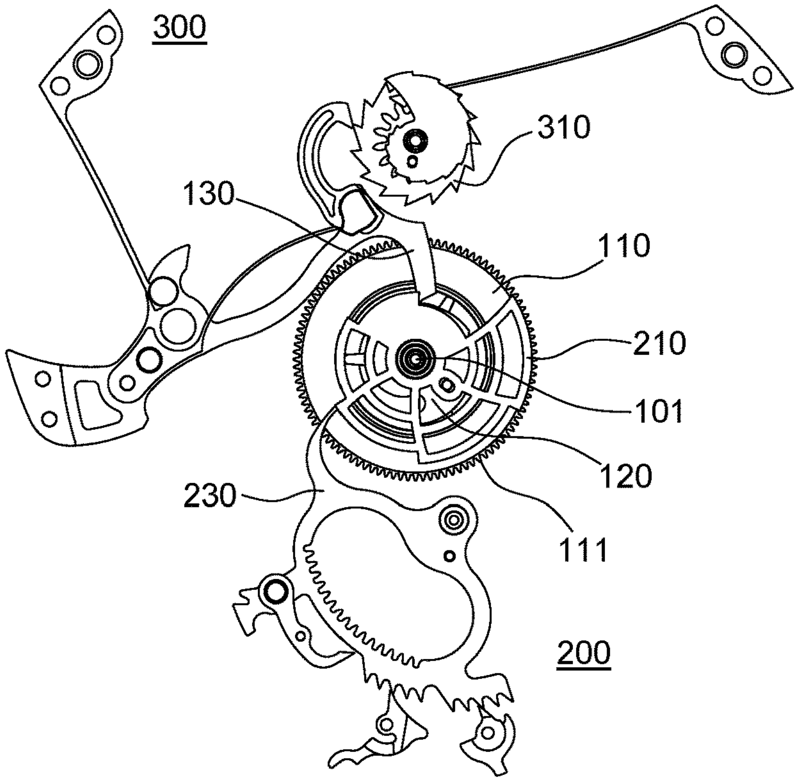
Figure 4B:
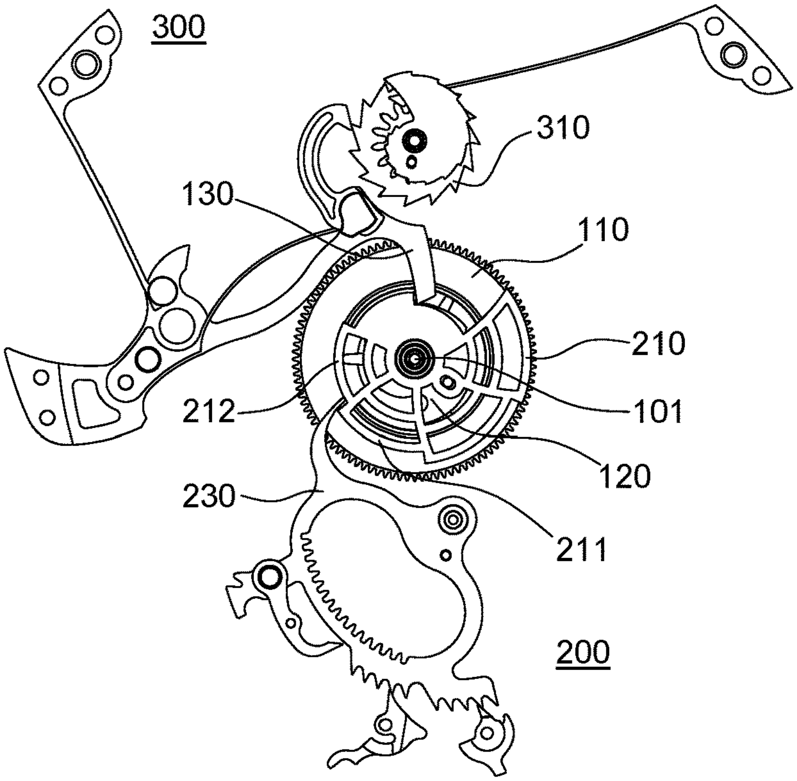

Indeed, as shown by FIGS. 4A-4B, said at least one safety device 100 has at least one first wheel 110 available, at least one second wheel 120 and at least one actuating member 130. The latter, that is to say said at least one safety device 100 can be associated with said at least one striking-work cam 210 including at least one distal portion 211 representing the integer part of a first number on which said at least one arm 230 is in contact, visible in FIG. 4A, and at least one proximal portion 212 representing the integer part of a second number as shown in FIG. 4B. In the embodiment of FIGS. 4A and 4B, said at least one striking-work cam 210 is a cam of the tens of seconds, but could also take the form of a cam of the seconds, of the quarter minutes, of the minutes, or of the quarter hours, or according to another embodiment, said at least one striking-work cam 210 can be a snail of the seconds, of the minutes or of the hours. Of course, it is possible to superimpose these various embodiments onto said at least one safety device 100.

Moreover, it is clearly visible in FIGS. 4A-4B that said at least one proximal portion 212 is closer to said shaft 101 than said at least one distal portion 211 so that when said at least one actuating member 130 acts on said at least one intermediate portion 123, said at least one arm 230 or feeler-spindle 230 palpates said at least one distal portion 211 instead of said at least one proximal portion 212.

In the following example based on FIGS. 4A-4B and for reasons of readability, said at least one striking-work cam 210 represents a cam of the tens of seconds 210, the cam of the second units is voluntarily omitted.

In all the drawings and in particular in FIGS. 1-3B, as mentioned above, said at least one second wheel 120 is driven by said at least one abutment member 115 when said at least one first wheel 110 is moving.

Said at least one second wheel 120 comprises at least one first and second portions 121, 122, preferably six portions to represent the six tens of seconds that constitute a minute and each said portion is separated by at least one intermediate portion 123.

As will be described below, said at least one safety device 100 also comprises at least one actuating member 130 configured to act on said at least one intermediate portion 123 so as to move forward the assembly of cam and snails of said striking-work mechanism 200 by a given angle, and more precisely by an angle proportional to said at least one intermediate portion 123. This forward movement is carried out every ten seconds and at the passage of the minute for example.

When said striking-work mechanism 200 is activated just before said at least one actuating member 130 moves forward the cam and snails assembly, then 59 seconds is struck for example, or the integer part of said first number. Thus, when said safety device 100 is integrated into a chronograph 300 comprising at least one driven wheel 310, said at least one actuating member 130 drives said at least one driven wheel 310, which can take the form of a counter 310 for example, when said at least one actuating member 130 acts on said at least one intermediate portion 123, so that said at least one driven wheel 310, or counter 310, is incremented.

And when said at least one actuating member 130 acts on said at least one intermediate portion 123, the cam and snails assembly of said striking-work mechanism 200 moves forward so as to strike the following minute and 0 seconds, or the integer part of said second number.

In the following example, it will be considered that the user initiates said striking-work mechanism 200 for a chronograph at 29.83 seconds for example, said at least one arm 230 or feeler-spindle 230 comes in contact with said at least one distal portion 211 and more exactly at the end of said at least one distal portion 211 and strikes two tens of seconds but also 9 seconds, even though the cam of the second units is not illustrated in this example, or the integer part of 29. In the case of a chronograph repeater that is poorly manufactured or without said safety device 100 according to the invention, the latter could strike 39 seconds, since because 29.83 seconds is close to 30 seconds, the feeler-spindle of the poorly manufactured chronograph could slip and strike three tens of seconds and 9 seconds. In other words, the difference between 29.83 seconds and 30 seconds is approximately 0.5% which could cause the poorly manufactured chronograph to make a rough approximation and strike three tens of seconds whereas the difference between 9.83 seconds and 10 seconds is approximately 2%, thus a margin of error sufficient to strike "only" 9 seconds.

The reasoning is identical if the chronograph indicates 9 minutes and 59 seconds for example. Said striking-work mechanism 200 would strike 9 minutes or the integer part of the minutes and 5 tens of seconds and 9 seconds or the integer part of the seconds, and not 10 minutes and 59 seconds because of the rough approximation.

This rough approximation could be due to a slight impact or wear of the end of the striking-work cam but also to the precision of machining and of assembly of the various parts present in the poorly manufactured chronograph repeater, and in the most common cases, brings the feeler-spindle in contact with the wrong part of the cam and thus strikes "incorrectly".

As mentioned above, one way to overcome this error is to add a surprise-piece. However, the latter induces an additional taking of torque at the end of striking on the one hand but especially, the jumper of the conventional striking-work mechanism, in contact with the surprise-piece, applies a torque on the chronograph wheel and could thus make the chronograph friction-spring slip and thus move the chronograph hand, which would cause an incorrect reading of the time timed by the user, which is not tolerable in said striking-work mechanism 200 for a chronograph of the applicant, where everything is perfectly adjusted and optimised to strike correctly.

Indeed, said safety device 100 of the applicant is a safety device without a surprise-piece 100 allowing to strike the integer part of a number indicated by an indicator on a dial via at least one first wheel 110, at least one second wheel 120 and at least one actuating member at least one actuating member 130, as visible in FIG. 1.

Figure 2A:
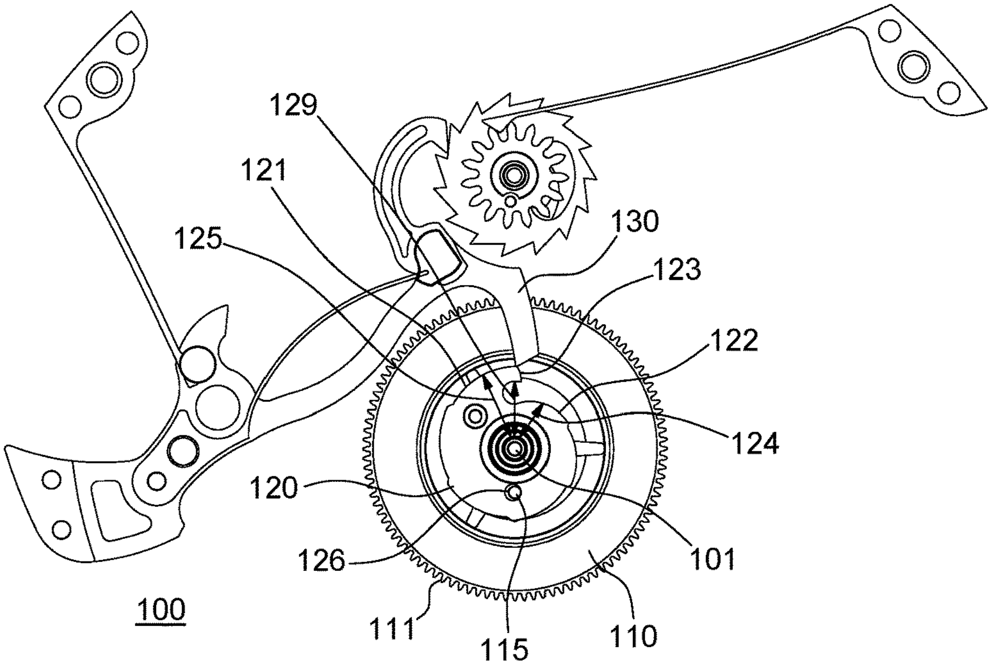
FIGS. 2A-2B disclose a part of a striking-work mechanism 200.
Figure 2B:
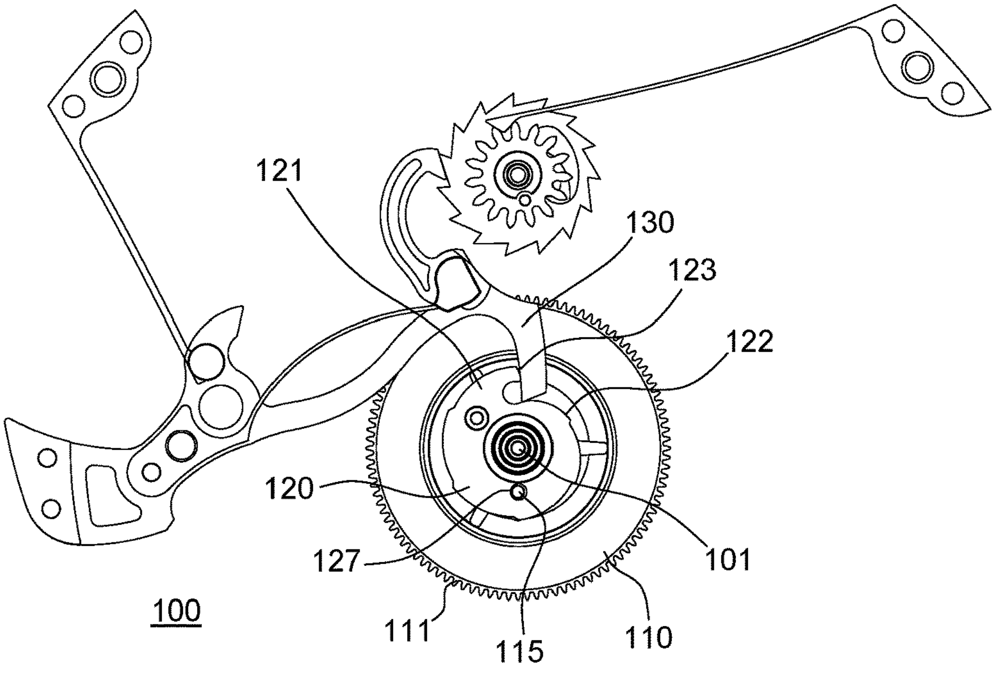
Figure 3A:
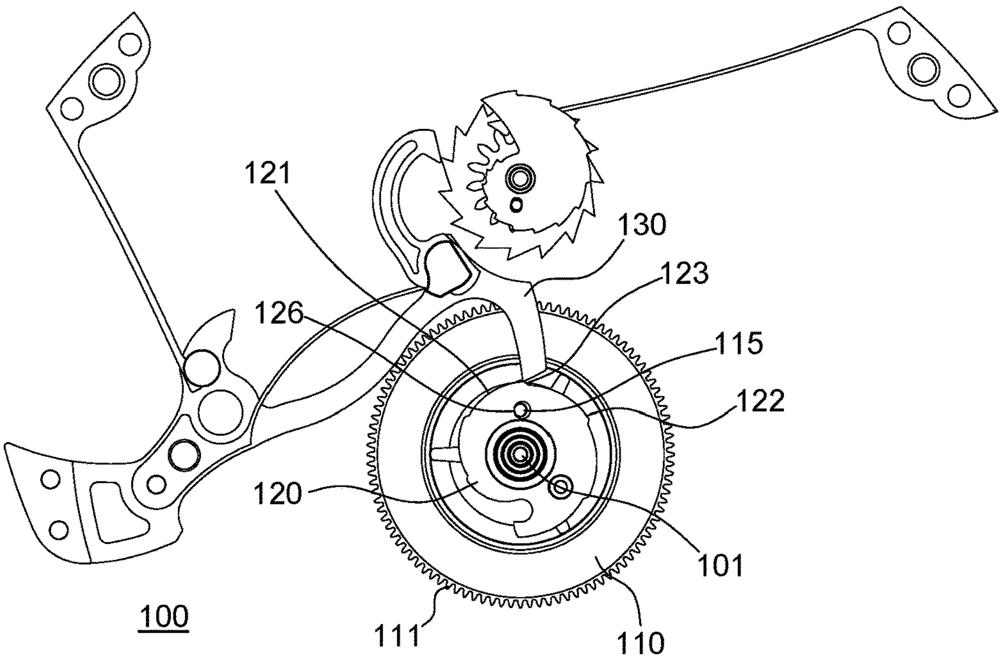
FIGS. 3A and 3B disclose a part of a striking-work mechanism 200; and, FIGS. 4A and 4B disclose a safety device 100 integrated into a chronograph 300.
Figure 3B:
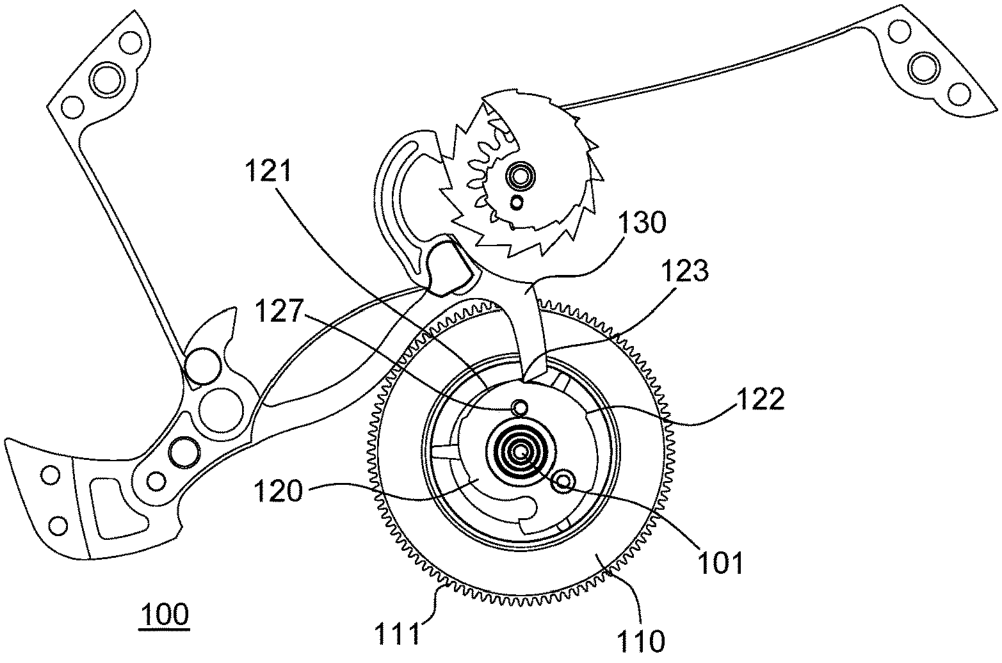

As for FIGS. 2A and 2B, they show said at least one first wheel 110 movably mounted on a shaft 101, preferably mounted movably in rotation about said shaft 101, which allows said safety device 100 and at the same time said striking-work mechanism 200 to be more compact and better adapted for repetitive movements like that of chronographs for example.

Indeed, said at least one first wheel 110 can be in the form of a disc 110 and/or of a pinion 110 or can comprise a disc and/or a pinion in order to be able to mesh. In this sense, the latter, that is to say said at least one first wheel 110 is provided with at least one tooth 111 to be able to be meshed.

Said at least one abutment member 115, mentioned above, can be disposed on said at least one first wheel 110 and configured to allow the driving of said at least one second wheel 120 when said at least one first wheel 110 is meshed.

In FIGS. 2A-3B, said at least one second wheel 120 is shown in a movable manner on said shaft 101, preferably said at least one second wheel 120 is mounted movably in rotation about said shaft 101, and configured to be driven by said at least one abutment member 115.

Again visible in FIGS. 2A-3B, said at least one second wheel 120 can be a drive cam 120, which can have a profile corresponding to seconds, tens of seconds, minutes, tens of minutes, quarter minutes, hours, tens of hours, or quarter hours for example. Said at least one second wheel 120 is called a drive cam 120 since it can drive said at least one striking-work cam 210.

Said at least one second wheel 120 can also include at least one first portion 121 corresponding to the integer part of a first number, at least one second portion 122 corresponding to the integer part of a second number and at least one intermediate portion 123 disposed between said at least one first portion 121 and said at least one second portion 122. It is exactly this portion, that is to say said at least one intermediate portion 123 that is configured to act with said at least one actuating member 130, mentioned above, so as to free said at least one second wheel 120 from said at least one abutment member 115 and thus allow said striking-work mechanism 200 to strike the integer part of said second number during a complicated passage.

As can be observed in the aforementioned drawings, said at least one first portion 121 is distant from said shaft 101 by a first distance 125 and said at least one second portion 122 is distant from said shaft 101 by a second distance 124. Said at least one intermediate portion 123, located between said at least one first portion 121 and said at least one second portion 122, is distant from said shaft 101 by an intermediate distance 129 between said first distance 125 and said second distance 124. It is obvious to a person skilled in the art that "distance" should be understood as meaning the average distance of said at least one first portion 121 with respect to said shaft 101: the same applies to said at least one second portion 122 and said at least one intermediate portion 123.

As mentioned above, said at least one second wheel 120 is mobile between at least one first position 126 and at least one second position 127, shown in FIGS. 2A, 3A and 2B, 3B, respectively. In said at least one first position 126, said at least one second wheel 120 is in contact with said at least one abutment member 115, since as described above, said at least one abutment member 115 drives said at least one second wheel 120, and when said at least one actuating member 130 acts on said at least one intermediate portion 123, said at least one second wheel 120 is moved towards said at least one second position 127, that is to say said at least one second wheel 120 is no longer in contact with said at least one abutment member 115: in other words, said at least one actuating member 130 frees said at least one second wheel 120 from said at least one abutment member 115.

The kinematics, which FIGS. 2A-2B and 3A-3B intend to reproduce, show how said at least one tooth 111, which includes at least one surface and/or at least one dimension, is configured to move said at least one actuating member 130 from said at least one first portion 121 towards said at least one intermediate portion 123, more particularly, how said at least one actuating member 130 is moved into contact with said at least one intermediate portion 123 so that it, that is to say said at least one actuating member 130, acts on said at least one intermediate portion 123 and frees said at least one second wheel 120 from said at least one abutment member 115.

Indeed, when said at least one first wheel 110 is driven in rotation about said shaft 101, or more exactly when said at least one first wheel 110 is meshed in rotation about said shaft 101 via said at least one tooth 111, said at least one actuating member 130 slides and/or rubs, according to the materials used, on said at least one first portion 121 which constrains said at least one second wheel 120 to be in contact with said at least one abutment member 115, and consequently, if said striking-work mechanism 200 is triggered, said at least one feeler-spindle 230 is in contact with said at least one distal portion 211.

In particular, said at least one actuating member 130 is configured to exert a force on said at least one second wheel 120 and preferably on said at least one first portion 121, on said at least one intermediate portion 123 and on said at least one second portion 122 and this force is generated by the force of gravity and/or by a bearing force exerted by a return member and/or a drive member on said at least one actuating member 130, which allows to maintain said at least one actuating member 130 in contact with said at least one second wheel 120.

When said at least one actuating member 130 is in contact with said at least one intermediate portion 123, the latter, that is to say said at least one intermediate portion 123 decomposes said force into a component radial to said shaft 101 and a component perpendicular to the radial component so as to move said at least one intermediate portion 123 faster than said meshed at least one first wheel 110 and thus allow said at least one second wheel 120 to be freed from said at least one abutment member 115, and consequently, if said striking-work mechanism 200 is triggered, said at least one feeler-spindle 230 is in contact with said at least one proximal portion 212.

Consequently, since said at least one safety device 100 is associated with said at least one striking-work cam 210, when the user initiates said striking-work mechanism 200 of the chronograph at 29.83 seconds of the example described above, said at least one actuating member 130 exerts a force on said at least one first portion 121 and said at least one feeler-spindle 230 comes in contact with said at least one distal portion 211 and more exactly at the end of said at least one distal portion 211 and strikes two tens of seconds or 9 seconds, according to whether it is a feeler-spindle of the integer part of the tens of seconds or of the integer part of the seconds and not 30 seconds.

When the chronograph indicates 30 seconds, said at least one actuating member 130 acts on said at least one intermediate portion 123 and thus said at least one second wheel 120 is moved faster than said at least one first wheel 110 and consequently said at least one second wheel 120 is freed from said at least one abutment member 115 which allows to present said at least one proximal portion 212 of said at least one striking-work cam 210 of said striking-work mechanism 200 facing said at least one feeler-spindle 230.

Finally, when said at least one feeler-spindle 230 comes in contact with said at least one proximal portion 212, the striking-work mechanism 200 strikes three tens of seconds, or the integer part of the tens of seconds.

The reasoning is identical if the chronograph indicates 9 minutes and 59 seconds for example. Said striking-work mechanism 200 would strike 9 minutes or the integer part of the minutes and 5 tens of seconds and 9 seconds or the integer part of the tens of seconds and of the seconds, and not 10 minutes and 59 seconds because of the rough approximation.

It is clear from the present description that the term "integer part" in the present invention has the same definition as that which is given in mathematics and in computer science, that is to say the natural integer part of a real number:

$$|n| \leq x < |n+1| \text{ with } n \in \mathbb{N}_0 \text{ et } x \in \mathbb{R} \qquad \text{(E01)}$$

For example, if the time indicated on the chronograph is 01'06", or 1 minute and 6 seconds, the integer part of said first number, that is to say of the minutes in this example, is 1 and the integer part of said second number, here again of the minutes, is 2.

With respect to the tens or the quarters, the definition is still valid since a division by ten or by a quarter should be carried out:

$$|n_{10}| \leq \frac{x}{10} < |n_{10} + 1| \text{ with } n_{10} \in \mathbb{N}_0 \ et\ x \in \mathbb{R} \qquad \text{(E02)}$$

$$|n_{15}| \leq \frac{x}{15} < |n_{15} + 1| \text{ with } n_{15} \in \mathbb{N}_0 \ et\ x \in \mathbb{R} \qquad \text{(E03)}$$

If the equations E03 and E02 are used, the fraction part is determined by the equation E01. For example, if the chronograph indicates 29 minutes and 59 seconds, the equation E03 gives 1 quarter hour and the fraction part is determined by the equation E01 which gives 14 minutes. The same applies to the seconds since E02 gives 5 tens of seconds and E01 gives 9 seconds. It thus follows that the integer part of the aforementioned first number is 1, 14, 5 and 9 according to the cam, and the integer part of the aforementioned second number is 2, 0, 0 and 0, here again according to the cam.

The invention claimed is:

1. A safety device for a striking-work of a horological mechanism for striking an indicator on a dial, said safety device comprising:

a first wheel, said at least one first wheel being configured to be meshed with and movably mounted on a shaft, said at least one first wheel comprising at least one abutment member;

a second wheel, said second wheel being movably mounted on said shaft and configured to be driven by said at least one abutment member when said at least one first wheel is meshed, said second wheel including at least one first portion, at least one second portion and at least one intermediate portion disposed between said at least one first portion and said at least one second portion, each of the first portion, second portion and intermediate portion are provided on an outer circumference surface of the second wheel; and an actuating member, said at least one actuating member being configured to act on said at least one intermediate portion so as to free said second wheel from said at least one abutment member and strike the at least one second portion, wherein the first portion, second portion, and intermediate portion are formed along a same plane, wherein said at least one first portion and said shaft are distant by a first distance, said at least one second portion and said shaft are distant by a second distance and said at least one intermediate portion and said shaft are distant by an intermediate distance, the intermediate distance is less than the first distance and greater than the second distance, and wherein the abutment member is located on the first wheel on a first side of the shaft, and the first, second and intermediate portions are located on the second wheel on a second side of the shaft, the second side being opposite to the first side.

2. The safety device according to claim 1, wherein said at least one first wheel is mounted movably in rotation about said shaft.

3. The safety device according to claim 1, wherein said second wheel is mounted movably in rotation about said shaft.

4. The safety device according to claim 1, wherein said second wheel is mobile between at least one first position and at least one second position, said second wheel is in contact with said at least one abutment member when said second wheel is at said at least one first position or at said at least one second position.

5. The safety device according to claim 1, wherein said at least one first wheel comprises at least one tooth to be meshed, said at least one tooth includes at least one surface and/or at least one dimension configured to move said at least one actuating member of said at least one first portion or of said second portion towards said at least one intermediate portion and to move said at least one actuating member in contact with said at least one intermediate portion so that said at least one actuating member acts on said at least one intermediate portion and frees said second wheel from said at least one abutment member.

6. The safety device according to claim 1, wherein said at least one actuating member is configured to exert a force on said second wheel and on said at least one first portion, said at least one second portion and/or said at least one intermediate portion so as to free said second wheel from said at least one abutment member, said force being generated by the force of gravity and/or by a bearing force exerted by a return member and/or a drive member on said at least one actuating member.

7. The safety device according to claim 6, wherein said at least one intermediate portion decomposes said force into a component radial to said shaft and a component perpendicular to the radial component configured to move said at least one intermediate portion so that said second wheel is freed from said at least one abutment member.

8. The safety device according to claim 1, wherein said at least one actuating member is in contact with said second wheel and in contact with said at least one first portion and at least one second portion, separated by at least one intermediate portion.

9. The safety device according to claim 1, wherein said at least one first wheel comprises a disc and/or a pinion.

10. The safety device according to claim 1, wherein said second wheel is a striking-work cam.

11. A striking-work mechanism comprising at least one safety device according to claim 1, at least one arm and at least one striking-work cam disposed on said at least one safety device, said at least one striking-work cam including at least one distal portion and at least one proximal portion, said at least one proximal portion being closer to said shaft than said at least one distal portion so that when said at least one actuating member acts on said at least one intermediate portion, said at least one arm is moved from said at least one distal portion towards said at least one proximal portion.

12. The striking-work mechanism according to claim 11, wherein said at least one striking-work cam is a striking-work cam of the seconds, of the tens of seconds, of the quarter minutes, of the minutes, or of the quarter hours.

13. A chronograph comprising at least one driven wheel, safety device according to claim 1, wherein said at least one actuating member drives said at least one driven wheel when said at least one actuating member acts on said at least one intermediate portion.

* * * * *